US011720529B2

(12) United States Patent
Mason

(10) Patent No.: US 11,720,529 B2
(45) Date of Patent: Aug. 8, 2023

(54) METHODS AND SYSTEMS FOR DATA STORAGE

(71) Applicant: International Business Machines Corporation, Armonk, NY (US)

(72) Inventor: W. Anthony Mason, Vancouver (CA)

(73) Assignee: International Business Machines Corporation, Armonk, NY (US)

(*) Notice: Subject to any disclaimer, the term of this patent is extended or adjusted under 35 U.S.C. 154(b) by 1274 days.

(21) Appl. No.: 15/791,486

(22) Filed: Oct. 24, 2017

(65) Prior Publication Data
US 2018/0046639 A1 Feb. 15, 2018

Related U.S. Application Data

(63) Continuation of application No. 14/156,132, filed on Jan. 15, 2014, now Pat. No. 9,830,329.

(51) Int. Cl.
| G06F 16/00 | (2019.01) |
| G06F 16/174 | (2019.01) |
| G06F 16/182 | (2019.01) |
| H04L 67/1097 | (2022.01) |
| G06F 16/10 | (2019.01) |
| G06F 16/2455 | (2019.01) |

(52) U.S. Cl.
CPC ........ G06F 16/1744 (2019.01); G06F 16/182 (2019.01); *G06F 16/10* (2019.01); *G06F 16/24556* (2019.01); *H04L 67/1097* (2013.01)

(58) Field of Classification Search
CPC .... G06F 16/1744; G06F 16/182; G06F 16/10; G06F 16/24556; H04L 67/1097
USPC ........................................................ 707/692
See application file for complete search history.

(56) References Cited

U.S. PATENT DOCUMENTS

| 4,135,240 A | 1/1979 | Ritchie |
| 4,959,811 A | 9/1990 | Szczepanek |
| 4,984,153 A | 1/1991 | Kregness et al. |
| 5,027,395 A | 6/1991 | Anderson et al. |
| 5,488,701 A | 1/1996 | Brady et al. |
| 5,506,983 A | 4/1996 | Atkinson et al. |
| 5,530,850 A | 6/1996 | Ford et al. |
| 5,537,588 A | 7/1996 | Engelmann et al. |

(Continued)

FOREIGN PATENT DOCUMENTS

| EP | 1320010 A2 | 6/2003 |
| WO | WO 2006/081508 A1 | 8/2006 |

OTHER PUBLICATIONS

Burrows et al., "On-line Data Compression in a Log-structured File System," proceedings of the Fifth International Conference on Architectural Support for Programming Languages and Operating Systems, Oct. 12-15, 1992, ACM Press, pp. 1-21.

(Continued)

*Primary Examiner* — Anhtai V Tran

(57) ABSTRACT

Disclosed are systems and methods for requesting operations at a remote server utilizing a network file system. A client may encapsulate a request for a cache coherency mechanism as an encapsulated message and provide the encapsulated message to a network file system executing on the client. The network file system may be configured to prevent the request for server functionality from being transmitted to the remote server. The client may also cause, via the network file system, the encapsulated message to be transmitted to the remote server.

27 Claims, 11 Drawing Sheets

(56) References Cited

U.S. PATENT DOCUMENTS

| | | |
|---|---|---|
| 5,551,003 A | 8/1996 | Mattson et al. |
| 5,560,008 A | 9/1996 | Johnson et al. |
| 5,574,898 A | 11/1996 | Leblang et al. |
| 5,606,983 A | 3/1997 | Monty et al. |
| 5,652,879 A | 7/1997 | Harris et al. |
| 5,664,178 A | 9/1997 | Sinofsky |
| 5,706,504 A | 1/1998 | Atkinson et al. |
| 5,715,441 A | 2/1998 | Atkinson et al. |
| 5,734,861 A | 3/1998 | Cohn et al. |
| 5,752,252 A | 5/1998 | Zbikowski et al. |
| 5,757,915 A | 5/1998 | Aucsmith et al. |
| 5,764,880 A | 6/1998 | Gerdt et al. |
| 5,781,797 A | 7/1998 | Crick et al. |
| 5,799,324 A | 8/1998 | McNutt et al. |
| 5,802,344 A | 9/1998 | Menon et al. |
| 5,815,707 A | 9/1998 | Krause et al. |
| 5,832,515 A | 11/1998 | Ledain et al. |
| 5,857,207 A | 1/1999 | Lo et al. |
| 5,873,097 A | 2/1999 | Harris et al. |
| 5,923,878 A | 7/1999 | Marsland |
| 5,991,893 A | 11/1999 | Snider |
| 5,996,054 A | 11/1999 | Ledain et al. |
| 6,006,227 A | 12/1999 | Freeman et al. |
| 6,021,408 A | 2/2000 | Ledain et al. |
| 6,021,509 A | 2/2000 | Gerdt et al. |
| 6,038,668 A | 3/2000 | Chipman et al. |
| 6,065,100 A | 5/2000 | Schafer et al. |
| 6,079,047 A | 6/2000 | Cotugno et al. |
| 6,101,186 A | 8/2000 | Craig |
| 6,108,420 A | 8/2000 | Larose et al. |
| 6,128,630 A | 10/2000 | Shackelford |
| 6,144,999 A * | 11/2000 | Khalidi ............... G06F 11/2064 709/219 |
| 6,148,368 A | 11/2000 | DeKoning |
| 6,240,527 B1 | 5/2001 | Schneider |
| 6,260,036 B1 | 7/2001 | Almasi et al. |
| 6,321,239 B1 | 11/2001 | Shackelford |
| 6,336,164 B1 | 1/2002 | Gerdt et al. |
| 6,347,397 B1 | 2/2002 | Curtis |
| 6,366,987 B1 | 4/2002 | Tzelnic et al. |
| 6,367,008 B1 | 4/2002 | Rollins |
| 6,377,958 B1 | 4/2002 | Orcutt |
| 6,381,682 B2 | 4/2002 | Noel et al. |
| 6,418,509 B1 | 7/2002 | Yanai et al. |
| 6,430,548 B1 | 8/2002 | Deis et al. |
| 6,438,594 B1 | 8/2002 | Bowman-Amuah |
| 6,449,688 B1 | 9/2002 | Peters et al. |
| 6,490,664 B1 | 12/2002 | Jones et al. |
| 6,526,570 B1 | 2/2003 | Click, Jr. et al. |
| 6,529,909 B1 | 3/2003 | Bowman-Amuah |
| 6,535,949 B1 | 3/2003 | Parker |
| 6,577,254 B2 | 6/2003 | Rasmussen |
| 6,597,812 B1 | 7/2003 | Fallon et al. |
| 6,601,104 B1 | 7/2003 | Fallon |
| 6,604,158 B1 | 8/2003 | Fallon |
| 6,624,761 B2 | 9/2003 | Fallon |
| 6,625,671 B1 | 9/2003 | Collette et al. |
| 6,628,411 B2 | 9/2003 | Miller et al. |
| 6,633,244 B2 | 10/2003 | Avery et al. |
| 6,633,883 B2 | 10/2003 | Koskas |
| 6,643,405 B1 | 11/2003 | Sako |
| 6,643,652 B2 | 11/2003 | Helgeson et al. |
| 6,654,851 B1 | 11/2003 | McKean |
| 6,657,565 B2 | 12/2003 | Kampf |
| 6,664,903 B2 | 12/2003 | Kugai |
| 6,667,700 B1 | 12/2003 | McCanne et al. |
| 6,697,846 B1 | 2/2004 | Soltis |
| 6,704,839 B2 | 3/2004 | Butterworth et al. |
| 6,711,709 B1 | 3/2004 | York |
| 6,732,125 B1 | 5/2004 | Autrey et al. |
| 6,738,863 B2 | 5/2004 | Butterworth et al. |
| 6,741,747 B1 | 5/2004 | Burns et al. |
| 6,742,028 B1 | 5/2004 | Wang et al. |
| 6,775,781 B1 | 8/2004 | Phillips et al. |
| 6,782,319 B1 | 8/2004 | McDonough |
| 6,785,768 B2 | 8/2004 | Peters et al. |
| 6,795,640 B1 | 9/2004 | Honda |
| 6,795,897 B2 | 9/2004 | Benveniste et al. |
| 6,804,718 B1 | 10/2004 | Pang et al. |
| 6,847,681 B2 | 1/2005 | Saunders et al. |
| 6,856,993 B1 | 2/2005 | Verma et al. |
| 6,901,403 B1 | 5/2005 | Bata et al. |
| 6,915,339 B2 | 7/2005 | Hartman et al. |
| 6,925,533 B2 | 8/2005 | Lewis |
| 6,944,619 B2 | 9/2005 | Gruenwald |
| 6,947,556 B1 | 9/2005 | Matyas, Jr. et al. |
| 6,983,456 B2 | 1/2006 | Poznanovic et al. |
| 7,051,031 B2 | 5/2006 | Schein |
| 7,085,766 B2 | 8/2006 | Keith, Jr. |
| 7,088,823 B2 | 8/2006 | Fetkovich |
| 7,100,047 B2 | 8/2006 | Stamons et al. |
| 7,107,267 B2 | 9/2006 | Taylor |
| 7,146,009 B2 | 12/2006 | Andivahis et al. |
| 7,191,189 B2 | 3/2007 | Bhatti |
| 7,225,333 B2 | 5/2007 | Peinado et al. |
| 7,272,687 B2 | 9/2007 | Balasubramanian |
| 7,340,581 B2 | 3/2008 | Gorobets et al. |
| 7,370,319 B2 | 5/2008 | Pensak et al. |
| 7,373,362 B2 | 5/2008 | Detweiler et al. |
| 7,392,383 B2 | 6/2008 | Basibes et al. |
| 7,409,470 B2 | 8/2008 | Halstead et al. |
| 7,418,500 B1 * | 8/2008 | Bolinger ................. G06F 21/00 707/999.008 |
| 7,418,588 B2 | 8/2008 | Lin et al. |
| 7,428,547 B2 | 9/2008 | Basso et al. |
| 7,444,625 B2 | 10/2008 | Anwar et al. |
| 7,454,411 B2 | 11/2008 | Birdwell et al. |
| 7,487,363 B2 | 2/2009 | Alve et al. |
| 7,502,713 B2 | 3/2009 | Hillier et al. |
| 7,512,748 B1 | 3/2009 | Mason et al. |
| 7,523,221 B2 | 4/2009 | Hillberg |
| 7,530,016 B2 | 5/2009 | Sahota et al. |
| 7,536,418 B2 | 5/2009 | Buchsbaum et al. |
| 7,546,221 B2 | 6/2009 | Moon et al. |
| 7,546,335 B2 | 6/2009 | Moeller et al. |
| 7,549,174 B1 | 6/2009 | Falkner et al. |
| 7,647,355 B2 | 1/2010 | Best et al. |
| 7,702,995 B2 | 4/2010 | Sahota et al. |
| 7,783,765 B2 | 8/2010 | Hildebrand et al. |
| 7,802,082 B2 | 9/2010 | Kruse et al. |
| 7,805,755 B2 | 9/2010 | Brown et al. |
| 7,809,897 B1 | 10/2010 | Mason et al. |
| 7,823,210 B2 | 10/2010 | Bessonov et al. |
| 7,930,756 B2 | 4/2011 | Crocker et al. |
| 7,949,693 B1 | 5/2011 | Manson et al. |
| 8,024,433 B2 | 9/2011 | Mason et al. |
| 8,266,114 B2 | 9/2012 | Mace et al. |
| 8,442,236 B2 | 5/2013 | De Petris et al. |
| 8,521,752 B2 | 8/2013 | Mason et al. |
| 8,539,228 B1 | 9/2013 | Mason et al. |
| 8,793,223 B1 | 7/2014 | Cho |
| 9,317,213 B1 | 4/2016 | Gupta |
| 2002/0052868 A1 | 5/2002 | Mohindra et al. |
| 2002/0073066 A1 | 6/2002 | Coutts et al. |
| 2002/0143735 A1 | 10/2002 | Ayi et al. |
| 2003/0110478 A1 | 6/2003 | Duesterwald et al. |
| 2003/0123446 A1 | 7/2003 | Muirhead et al. |
| 2004/0015958 A1 | 1/2004 | Veil et al. |
| 2004/0111642 A1 * | 6/2004 | Peles ................... H04L 63/0218 726/4 |
| 2004/0250247 A1 | 12/2004 | Deeths et al. |
| 2005/0131997 A1 | 6/2005 | Lewis |
| 2005/0144189 A1 | 6/2005 | Edwards et al. |
| 2005/0240966 A1 | 10/2005 | Hindle et al. |
| 2006/0031246 A1 | 2/2006 | Grayson |
| 2006/0070076 A1 | 3/2006 | Ma |
| 2006/0101025 A1 | 5/2006 | Tichy et al. |
| 2006/0123250 A1 | 6/2006 | Maheshwari et al. |
| 2006/0190417 A1 | 8/2006 | Hilkemeyer et al. |
| 2006/0195476 A1 | 8/2006 | Nori et al. |
| 2007/0226320 A1 * | 9/2007 | Hager ................... G06F 16/182 707/E17.01 |
| 2008/0134154 A1 | 6/2008 | Patel et al. |
| 2009/0113420 A1 | 4/2009 | Pawlowski |

(56) References Cited

U.S. PATENT DOCUMENTS

| | | |
|---|---|---|
| 2009/0249277 A1 | 10/2009 | Prakash |
| 2010/0094806 A1 | 4/2010 | Apostolides et al. |
| 2010/0185704 A1* | 7/2010 | George .................. H04L 67/42 707/821 |
| 2010/0211616 A1 | 8/2010 | Khandelwal et al. |
| 2010/0217948 A1 | 8/2010 | Mason et al. |
| 2011/0153780 A1 | 6/2011 | Rao |
| 2012/0173759 A1* | 7/2012 | Agarwal ................ H04L 69/22 709/241 |
| 2013/0046846 A1 | 2/2013 | Mason et al. |
| 2013/0117293 A1 | 5/2013 | Mason et al. |
| 2013/0218955 A1* | 8/2013 | Vidan ..................... G06F 9/546 709/203 |
| 2013/0311493 A1 | 11/2013 | Mason et al. |
| 2014/0006347 A1* | 1/2014 | Qureshi .................. H04L 67/10 707/621 |
| 2014/0280398 A1* | 9/2014 | Smith ..................... G06F 16/27 707/825 |
| 2014/0324785 A1* | 10/2014 | Gupta .................. G06F 16/2365 707/689 |
| 2015/0071139 A1* | 3/2015 | Nix ........................ H04L 67/04 370/311 |
| 2015/0118958 A1* | 4/2015 | Jain ..................... G06Q 20/347 455/41.1 |
| 2015/0200817 A1* | 7/2015 | Mulchandani ......... H04L 67/28 709/223 |
| 2915/0200817 | 7/2015 | Mulchandani |
| 2016/0099963 A1* | 4/2016 | Mahaffey ............ H04L 63/0227 726/25 |

OTHER PUBLICATIONS

Rosenblum, Mendel and Ousterhout, John K., "The Design and Implementation of a Log-Structured File System," ACM Transactions on Computer Systems, vol. 10, No. 1, Feb. 1992; pp. 26-52.
"Sponsor Sessions," http://microsoft.com/whdc/driverdevcon/ddctracks2005/d05_sponsors.mspx, updated Mar. 25, 2005, printed Apr. 25, 2006, 2 pages.
"Windows Driver Devcon 2005; Practical Challenges in Implementing Encryption/Compression Filters," Microsoft Windows Hardware & Driver Central, Microsoft Corporation, 2005, 21 pages.
Mac OS X ABI Mach-O File Format Reference, Oct. 3, 2006, 62 pages.
"Windows Streams—An Introduction to File System Streams," printed from http://www.osronline.com, The NT Insider, vol. 13, Issue 2, Mar.-Apr. 2006, Apr. 17, 2006, 6 pages.
Duncan, Geoff, "Man Buys Used iPod with U.S. Troop Data", Jan. 27, 2009, printed from http://digitaltrends.com/international/man-buys-used-ipod-with-us-troop-data/ (1 page).
Bressoud, Thomas C. et al., "OpenCAS: A Flexible Architecture for Content Addressable Storage", Proceedings of the ISCA 17$^{th}$ International Conference, Parallel and Distributed Computing Systems, San Francisco, California, Sep. 15-17, 2004, pp. 580-587.
Sun, Hongwei, "Client caching features: Oplock vs. Lease," May 22, 2009, downloaded from http://blogs.msdn.com/b/openspecification/archive/2009/05/22/client-caching-features-oplock-vs-lease.aspx on Jan. 15, 2014.
Heinrich, Mark Andrew, "The Performance and Scalability of Distributed Shared Memory Cache Coherence Protocols," Chapter 2, Cache Coherence Protocols, Ph.D. Dissertation, Computer Systems Laboratory, Stanford University, Oct. 1998, downloaded from http://www.csl.cornell.edu/~heinrich/dissertation/ on Jan. 15, 2014.
Mason, W. Anthony, "Locks," seminar slides presented in 2008, OSR Open Systems Resources, Inc., 10 pages.
Corrected Notice of Allowability dated Jul. 24, 2013 in U.S. Appl. No. 11/145,433.
Notice of Allowance and Examiner-Initiated Interview Summary dated Jul. 1, 2013 in U.S. Appl. No. 11/509,391.
Notice of Allowance dated May 26, 2011 in U.S. Appl. No. 11/789,147.
Notice of Allowance dated Jan. 20, 2011 in U.S. Appl. No. 11/844,102.
Notice of Abandonment under 37 CFR 1.53(f) or (g) dated Oct. 11, 2011 in U.S. Appl. No. 12/985,923.
Notice of Allowability dated Dec. 17, 2008 in U.S. Appl. No. 11/505,582.
Notice of Allowance dated Jul. 1, 2010 in U.S. Appl. No. 12/388,712.
Notice of Abandonment dated Dec. 17, 2012 in U.S. Appl. No. 12/658,209.
Office Action dated Dec. 23, 2013 in U.S. Appl. No. 13/668,033.

* cited by examiner

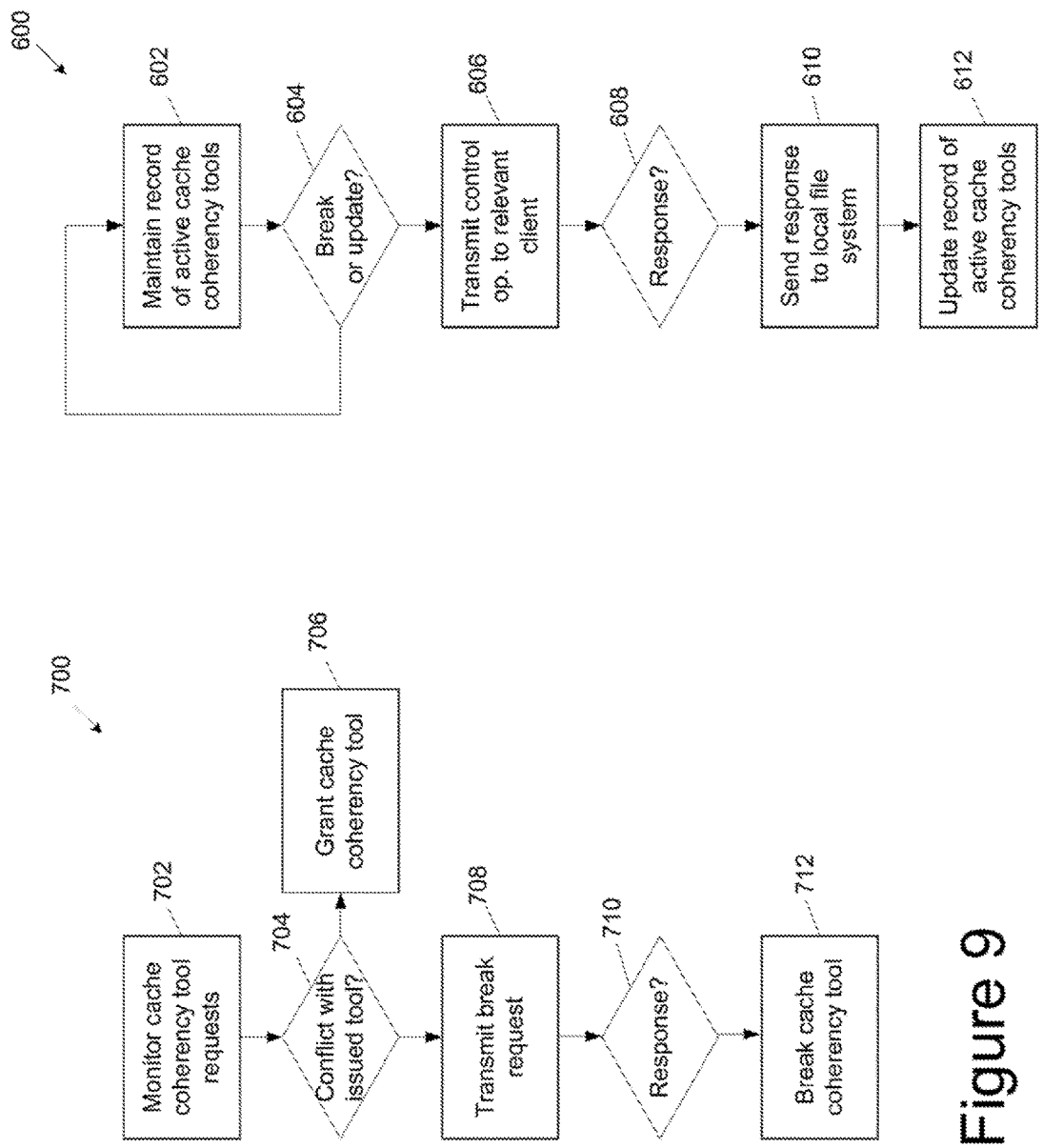

METHODS AND SYSTEMS FOR DATA STORAGE

CROSS-REFERENCE TO RELATED APPLICATION(S)

This application is a continuation of U.S. patent application Ser. No. 14/156,132, filed Jan. 15, 2014, entitled "METHODS AND SYSTEMS FOR DATA STORAGE," which is incorporated by reference herein in its entirety.

BACKGROUND

Increasing numbers of computer devices utilize data sharing, where a single file or other data unit is accessed and operated on by multiple computer devices. For example, data can be stored at server-side storage, including cloud storage. Multiple clients may have access to the data. Examples of commercially-available remote data services include the SIMPLE STORAGE SERVICE or S3, available from AMAZON WEB SERVICES LLC and the AZURE service available from MICROSOFT CORPORATION.

Data sharing schemes provide many advantages, including high availability, increased accessibility, data back-up, and a reduced need for local data storage hardware. On the other hand, increased access times for remote data storage lead to increased system latency and slower operation. Many systems address the latency issue utilizing local caching. According to local caching, clients maintain copies of files or other units of data at local storage. This increases the speed of read and write requests, but also creates complexity when more than one client or application attempts to read or write to the same data. Most servers address this issue by operating cache coherency schemes. According to cache coherency schemes, clients receive permission from a server to cache certain units of data. The server then manages situations where multiple clients attempt to cache the same unit of data simultaneously. According to one common cache coherency scheme, the server issues an operational lock (oplock), a lease, or other cache coherency mechanism to a client entitling the client to cache a unit of data and perform certain operations on the data. The extent of allowed operations (e.g., read, write, attribute, handle) are determined by the type of oplock issued. For example, when a first client performs an incompatible operation on a unit of data that is the subject of an existing oplock to a second client, the server may break the oplock with the second client.

According to existing network file systems, the client executes a network file system component to handle communication with the server as well as cache coherency. For example, when an application requests to read or write to a file, the request is forwarded from the application, to the operating system and ultimately to the network file system component. The network file system component communicates with the appropriate server to request any required oplocks or other cache coherency mechanisms and, if permitted, make the requested data manipulation. Many network file system implementations, however, do not permit cache coherency requests from components other than the network file system component.

BRIEF DESCRIPTION OF THE FIGURES

Various embodiments of the present invention are described here by way of example in conjunction with the following figures, wherein:

FIG. 9 is flow chart showing one embodiment of a process flow that may be executed by the file system or other suitable server component to handle a request for a cache coherency mechanism.

FIG. 10 is a flow chart showing one embodiment of a process flow that may be executed by the filter component to manage cache coherency requests routed through the filter component.

DESCRIPTION

Various embodiments are directed to systems and methods for utilizing a server-side filter component to export server functionality to various client components. The client may be programmed to encapsulate a request for server functionality into a control command, for example, a control command that is unrecognized by the network file system executed by the client. The network file system may forward the control command to the server, where it may be intercepted by a filter component executed by the server. The filter component may decode and implement the request for server functionality. In various embodiments, the request for server functionality may relate to functionality that is not otherwise available to components of the client above the level of the network file system. For example, in some embodiments, the request for server functionality is a request for a cache coherency guarantee. According to several existing protocols, such a request would be refused by the network file system and not forwarded to the server at all. Also, in some embodiments, the request for server functionality is a request to execute a service resident at the server. The service may be pre-existing or may be a service specifically implemented at the server to be called from the client. Examples of server-executed services include data compaction or garbage collection, file identification (ID) and naming services, and file metadata services.

Figure 1:
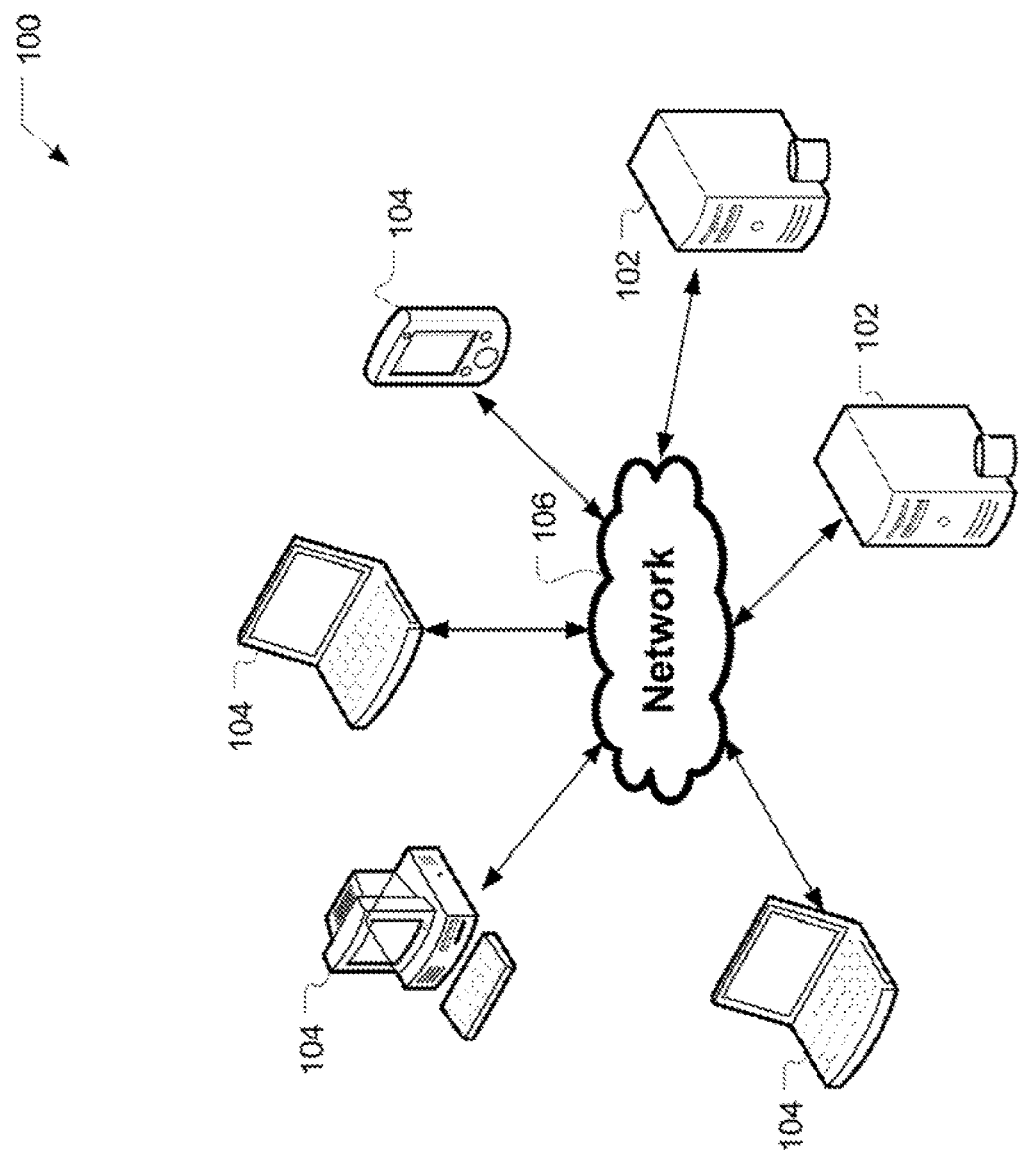
FIG. 1 shows a diagram of one embodiment of a network environment comprising one or more servers, for exporting functionality of the servers to various clients.

FIG. 1 shows a diagram of one embodiment of a network environment 100 comprising one or more servers 102, for exporting functionality of the servers 102 to various clients 104. Each server 102 may comprise any suitable type of computer device or devices including, for example, one or more servers and associated data storage hardware. Individual servers 102 may be located at a common physical location or distributed across multiple physical locations. The environment 100 also comprises a plurality of client devices 104. The client devices 104 may be and/or be executed by any suitable type of computer device including, for example, a desktop computer, a portable computer, a mobile device, etc. The client devices 104 may communicate read and/or write requests to a server 102 to access data stored at the servers 102. The servers 102, in some embodiments, implement a cache coherency scheme to maintain data integrity. The servers 102 and client devices 104 may be in communication with one another via a network 106, which may include any suitable type of wired or wireless computer communications network such as, a wide area network (WAN), a local area network (LAN), etc.

Figure 2:
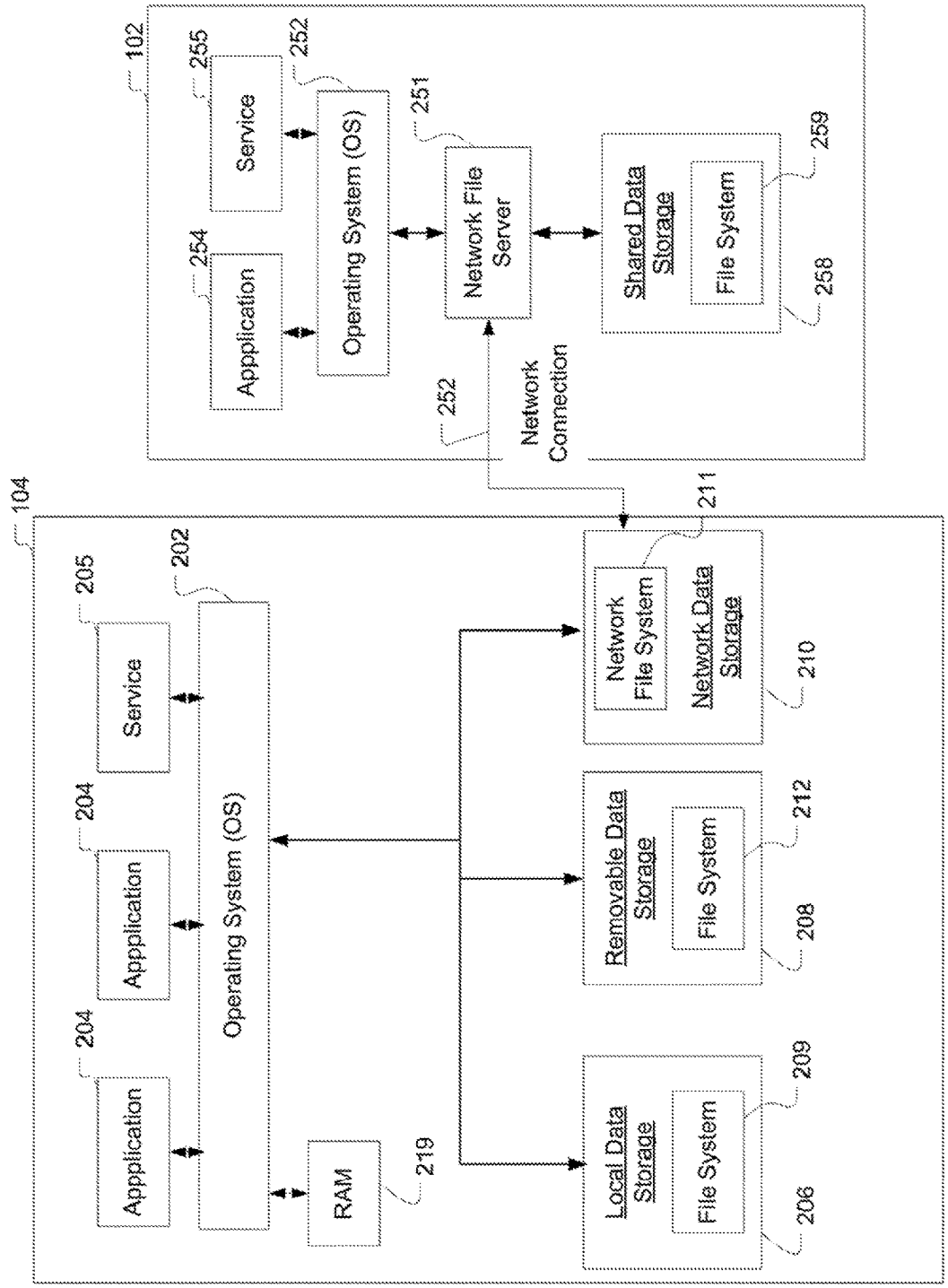
FIG. 2 shows a logical block diagram showing system architectures for one embodiment of a client and a server.

FIG. 2 shows a logical block diagram showing system architectures for one embodiment of a client 104 and a server 102. The client device 104 may execute an operating system 202 and at least one application 204. In some embodiments, the client device 104 also executes one or more services 205, described in more detail herein. An application 204 or service 205 may include a group of one or more software components executed by a processor or processors of the client device 104. It will be appreciated that the client device 104 may execute additional applications 204 or services 205 that are not shown. Concurrently executed applications 204 or services 205 may execute sequentially or simultaneously relative to one another. Each application 204 or service 205 may perform at least one task such as, for example, providing e-mail service, providing word processing, rendering a document with or without editing capability, providing financial management services, etc. In some embodiments, services 205 may be directed to tasks related to the maintenance and/or upkeep of the server device 104. Applications 204 and services 205 may perform tasks by manipulating data, which may be retrieved from the data storage 206, 208, 210 and/or memory 219 (e.g., random access memory or RAM).

To acquire data for manipulation and output results, applications 204 generate data requests that identify particular data blocks stored by the data stores 206, 208, 210. The data requests may be directed to an operating system 202. Data requests may include any type of request to manipulate data (e.g., data stored at the data stores 206, 208, 210). Example data requests include read requests and write requests. Data requests may specify a data block or blocks to be read or written, a logical position of the data block or blocks, and an operation to be performed on the data block. When the data request is a write request, it may also include a data block or blocks to be written. The logical position of the data block or blocks may be expressed, for example, as a file, directory, etc., or other logical grouping defined by a file system 209, 211, 212 of the relevant data store 206, 208, 210.

The operating system 202 may facilitate communications between the application 204 and one or more data storage locations 206, 208, 210. The operating system 202 may be any suitable operating system. For example, in various non-limiting embodiments, the operating system 202 may be any version of MICROSOFT WINDOWS, any UNIX operating system, any Linux operating system, OS/2, any version of Mac OS, etc. In various embodiments, the operating system 202 may handle and/or direct data requests from the applications 204, services 205 and other components of the client 104.

The data storage locations 206, 208, 210 may include any suitable data stores that are part of, or are in communication with the client device 104. Local data store 206 may comprise one or more physical devices capable of storing data in an electronic or other suitable computer-readable format including, for example, a single fixed disk drive, an array of disk drives, an array of disk drives combined to provide the appearance of a larger, single disk drive, a solid state drive, etc. Removable data store 212 may comprise any type of data storage that is removable from the server 104 including, for example, a USB flash or pen drive, an external hard drive, etc.). Network data storage 210 may represent storage that is physically present at the server 102 or other remote location.

Each of the respective data stores 206, 208, 210 may comprise data blocks logically and physically organized according to respective file systems 209, 211, 212. A data block may represent the smallest unit of data handled by the respective data stores 206, 208, 210. Logical constructs, such as files of a given file system 209, 211, 212, other data containers, etc., may be expressed as one or more data blocks. Metadata may also be expressed as one or more data blocks. The size of data blocks may depend, for example, on the implementation of the data store 206, 208, 210. For example, many physical storage drives have disks with sectors that are 4 kilobytes. Some disks may have slightly larger sectors, leaving additional bytes for a checksum. Other disks may have different sector sizes (e.g., 512 bytes, 1024 bytes, etc.) Accordingly, some embodiments may utilize data blocks that are 512 bytes, 1024 bytes, 4 kilobytes, or any other suitable size. A further delineation of data blocks may be determined by cluster size (e.g., according to the selected file system 209, 211, 212). For example, a typical file system cluster may be 4096 bytes or 4 kilobytes (kB) and, some physical storage devices, such as CD-ROM's, have clusters that are 2048 bytes (2 kB). Accordingly, 4 kB and 2 kB data blocks may be desirable in some embodiments.

For the local and removable data storage, the file system(s) 209, 212 maps logical information describing stored data to the physical location(s) of the stored data on the data storages 206, 208. The network data storage 210 and network file system 211, in various embodiments, may behave in a similar manner as the data stores 206, 208 and file systems 209, 212. Instead of physically storing data, however, the network data storage 210 may host the network file system 211 that manages data stored at the server 102. For example, data requests may be directed to the network data storage 210 and network file system 211 in the same manner that they are directed to the other data stores 206. Data requests directed to the network data storage 210 may be executed at a shared data storage 258 of the server 102, e.g., by the local file system 259 of the server 102.

Referring now to the server 102, it may execute an operating system 252, one or more optional applications 254, and one or more optional services 255, described in additional detail herein. A network file server 251 may manage shared data storage 258. For example, the network file server 251 may manage data requests from the various clients 104, (e.g., network file systems 211 thereof.) The shared data storage 258, as described herein, may be organized and/or managed by a local file system 259 that may be any file system including, for example, those listed above. The shared data storage 258 of the server 102 may be utilized by the client 104 as well as other clients 104. For example, although only one client device 104 is shown in FIG. 2, it will be appreciated that the server 102 may be in communication with multiple similar client devices 104, for example, as shown in FIG. 1.

In the client 104, data requests may originate from an application 204. The data request are provided by the application 204 to the operating system 202. (It will be appreciated that some read and write requests may originate directly from a service 205, the operating system 202 or other system components.) In various embodiments, the application 204 may utilize an application program interface (API) or other library (not shown) to facilitate communication between the application 204 and the operating system 202. When the relevant data block is located at a locally-accessible data storage, such as the local data storage 206 or removable data storage 208, the operating system 202 may service the data request by accessing the appropriate data storage via the appropriate file system 209, 212. For example, the file systems 209, 212 may map the logical position of the data block to a physical position on the respective data stores 206, 208. Read requests provided to a data storage 206, 208 may comprise an identifier(s) of a logical position data block or blocks to be read (e.g., a logical block identifier). Write requests provided to a data storage 206, 208 may comprise identifier(s) of a logical position of a data block or blocks to be written, along with the data blocks to be written. The data storage 206, 208, file system 212, or a storage driver may execute the read and write requests. For example, in response to a read request, the requested data block may be returned. It will be appreciated that some data blocks from data storages 206, 208 may be cached at local memory 219. Accordingly, some read or write requests from the application 102 may be handled directly from memory 112, 114.

Some data requests may be directed to data blocks stored at network data storage 210, representing the server 102. In this case, the operating system 202 may direct the data request to the network file system 211. The network file system 211 may initially determine if the data block is cached locally at the client 104 (e.g., at RAM 219 or on a locally-available data storage such as 206 or 208). If the data block is cached locally, then network file system 211 may direct the data request to the locally-cached version of the data block. For example, if the data block is cached locally, it may indicate that the network file system 211 has obtained a currently valid cache coherency mechanism from the server 102 for the data block. If the data block is not locally cached, then the network file system 211 may communicate with the server 102 to manipulate the data block and/or request an appropriate cache coherency mechanism to authorize caching the data block locally. Authorization for the network file system 211 to read or write the data block may be granted, for example, if no other parties (e.g., clients 104 or applications executed thereon) hold a valid cache coherency mechanism covering the data block that would prevent the requested read or write. When such authorization is granted, the network file server 251 may either write the data block to the shared data storage 258 and/or provide the data block from the shared data storage 258 to the network file system 211. In some embodiments, the network file system 211 may additionally request a cache coherency mechanism permitting local caching of the data block at the client 104. The request may be transmitted to the network file server 251 and ultimately to the file system 259. In this way, the server 102 may grant authorization to read or write to the data block and/or to obtain a cache coherency mechanism unless another partly already possesses a valid cache coherency mechanism on the data block. If this is the case, then the server 102 (e.g., the network file system 251), may optionally request that the issued cache coherency mechanism be broken. If the existing cache coherency mechanism is broken, then authorization to read or write may be granted and/or a new cache coherency mechanism may be issued to the requesting network file system 211.

Figure 5:
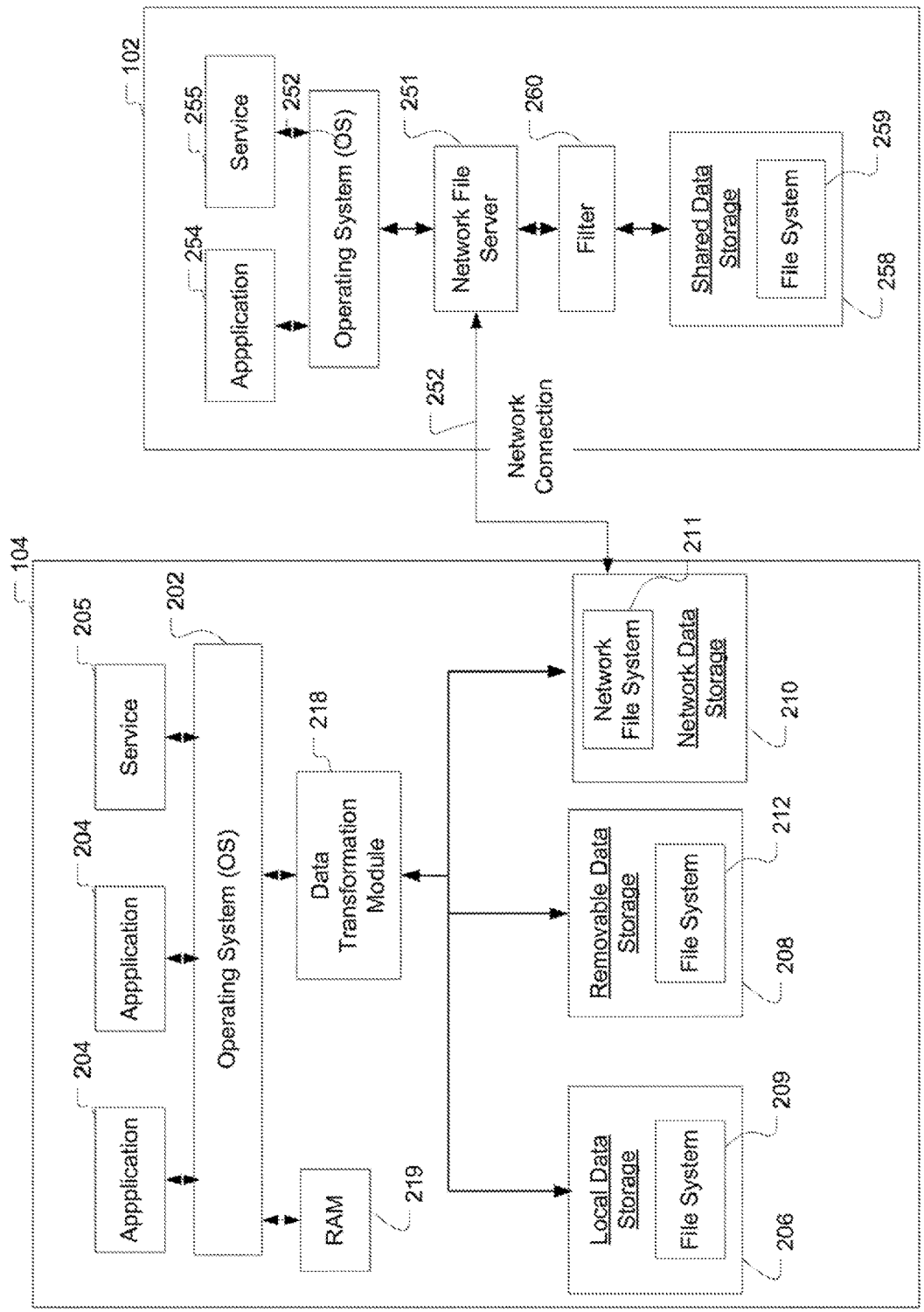
FIG. 5 is a logical block diagram showing system architectures for another embodiment of a client and a server including a data transformation module.

In various embodiments, the server 104 may execute a data transformation module 218 logically positioned above the network file system 211 (FIG. 5). The data transformation module 218 may be configured to perform various transformations on data stored at the data stores 206, 208, 210. Any type of data transformation may be performed including, for example, encryption, compression, translations from a first language to a second language, (e.g., English to Chinese), transformation from a first data format or encoding to a second data format or encoding, (e.g. ASCII data to UNICODE data), etc.

Figure 3:
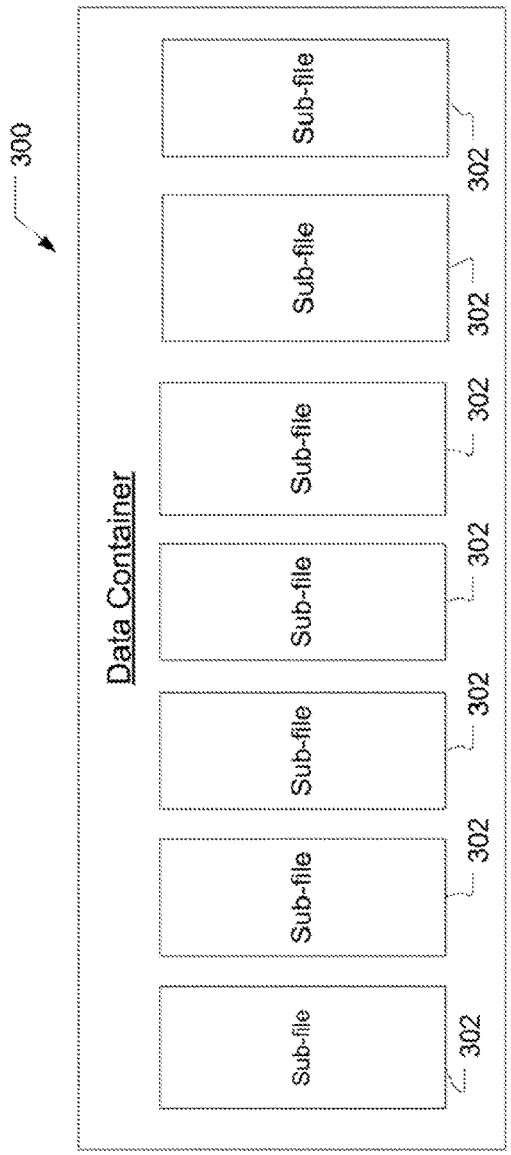
FIG. 3 is a block diagram of a data container that showing one embodiment of a sub-file scheme.

In some embodiments, the data transformation module 218 is configured to implement a sub-file scheme. According to a sub-file scheme, the data transformation module implements multiple sub-files within a single data container. FIG. 3 is a block diagram of a data container 300 that illustrating one embodiment of a sub-file scheme. As illustrated, the data container 300 comprises a plurality of sub-files 302. Each sub-file 302, for example, may represent a file according to the expectations of the application 204. The data transformation module may store the data container 300 at the relevant data store 206, 208, 210 according to a logical grouping of the relevant file system 209, 212, 211. For example, the data container 300 may be stored as a file of the relevant file system 209, 212, 211. In a MICROSOFT WINDOWS environment, this concept may be called a "file system filter driver;" in a UNIX/Linux environment, it may be called a "layered" or "stackable" file system; and in MICROSOFT DISK OPERATING SYSTEM (MS-DOS), it may be called an INT21 or INT13 driver. The data container 300 comprises multiple sub-files 302.

Figure 4:
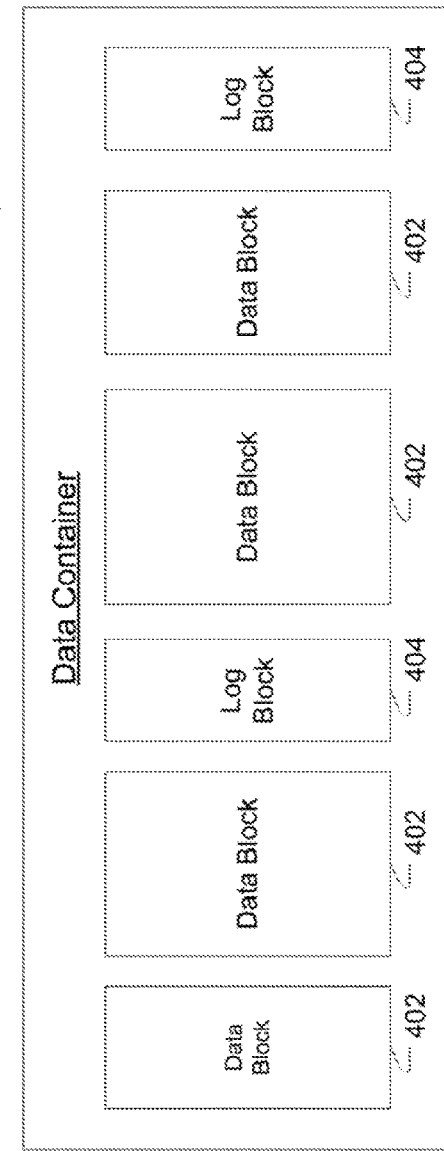
FIG. 4 is a block diagram of the data container organized therein according to a log-structured file system.

The sub-files 302 may be organized within the data container 300 in any suitable manner. For example, in some embodiments, the data transformation module may implement a log-structured file system within the data container, where the sub-files are "files" of the log-structured file system. For example, FIG. 4 is a block diagram of the data container 300 organized therein according to a log-structured file system. In FIG. 4, the sub-files 302 are represented as a series of data blocks 402 and log blocks 404. The data blocks 402 represent units of data making up the sub-files 302. The log blocks 404 represent metadata that may be used to translate the data blocks 402 to the sub-files 302. For example, when a change to a sub-file is written to the data container 300, the data transformation module may write a data block 402 representing the change to a logical end of the data container 300 along with a log block 404 describing the relationship between the newly written data block 402 and one or more sub-files. When a sub-file 302 is to be read from the data container 300, the data transformation module traverses the data container beginning at the logical end, examining all log blocks 404 until the most current data block or blocks 402 corresponding to the desired sub-file 302 are identified. Various implementations and applications of data transformation modules, including data transformation modules for implementing sub-file schemes and log-structured files systems are described in U.S. Patent Application Publication No. 2006/0277153, filed on Jun. 3, 2005, U.S. Patent Application Publication No. 2010/0217948, filed on Feb. 4, 2010, U.S. Pat. No. 8,024,433, filed on Apr. 4, 2007, and U.S. Pat. No. 7,949,693, filed Aug. 23, 2007, which are incorporated herein by reference in their entireties.

FIG. 5 is a logical block diagram showing system architectures for another embodiment of a client 104 and a server 102 showing the optional data transformation module 218. The data transformation module 218 may be positioned to intercept data requests (e.g., read and write requests) originating from the applications 204 and, in some embodiments, from the service 205. As illustrated in the example of FIG. 5, the data transformation module 218 is logically positioned at the server 104 between the operating system 202 and the respective data stores 206, 208, 210. It will be appreciated, however, that the data transformation module 218 may be logically positioned anywhere between the applications 204 and the data stores 206, 208, 210. For example, in some embodiments, the data transformation module 218 may be logically positioned between the applications 204 and the operating system 202.

Upon intercepting a write request originating from an application 204 (or service 205) the data transformation module 218 may perform any relevant transformation on the data block to be written and then generate a second write request to the relevant data store 206, 208, 210 where the second write request comprises the transformed data block. The transformation may be any of the transformations described herein above. For example, where the transformation comprises implementing a sub-file scheme, the data transformation module 218 may convert the data block to a sub-file, place the sub-file within a new or existing file according to the file system at the appropriate data store 206, 208, 210, and write to the existing file. Read requests may be similarly handled, with the data transformation module 218 deriving the physical position of the requested data block and reversing any previously performed transformation to return the data block to the application 204 in the expected form.

Because the data transformation module 218 changes the form of the data blocks that are the subject of the data requests, it may also be desirable for the data transformation module 218 to modify the native caching otherwise implemented by the client 104 and/or server 102. For example, native caching implemented by the operating system 202 and/or the file systems 212, 211, 209 may cache data blocks in an un-transformed format, which may be unreadable to applications 204. For example, if the data transformation module 218 implements encryption, the native caching may cache the encrypted versions of the data that are physically stored on the data stores 206, 208, 210. Also, for example, if the data transformation module 218 implements a sub-file scheme, the native caching may cache data containers, such as 300, logically organized according to the native file system, whereas the applications 204 or services 205 may expect to read and write directly to the sub-files 302, which may not be visible to the native file system.

As a result, the data transformation module 218 may be programmed to also control the cache state of data to ensure that applications 204 see the un-transformed version or view of a given cached data block. For example, in some embodiments, the operating system 202 (or other system component implementing caching) may receive data blocks to be cached from the data transformation module 218. In this way, the data transformation module 218 may provide un-transformed data for caching. Also, for example, when cached data blocks are written to one of data stores 206, 208, 210, the data blocks may be written through the data transformation module 218, which may transform the data blocks prior to storage at 206, 208, 210.

Because cache requests are routed through the data transformation module 218, the data transformation module 218 may manage cache coherency on the client 104. When cached data is stored on the network data storage 210, however, this requires the data transformation module 218 to request cache coherency mechanisms from the server 102. Unfortunately, many existing network file system protocols, such as various versions of Server Message Block (SMB), Network File System (NFS), etc. do not facilitate cache coherency requests from an outside component, such as the data transformation module such as 218. Instead, cache coherency services, as well as various other services, are consumed by the network file system 211. For example, the data transformation module 218 could direct a cache coherency request to the network file system 211 for transmission to the server 102. The network file system 211, however, would not forward the cache coherency request to the server 102. Accordingly, clients 104 utilizing a data transformation module 218 have either had to forgo caching of data from the server 102 or make other costly and compatibility-limiting modifications to the client 104 and/or applications 204 executing thereon.

Figure 6:
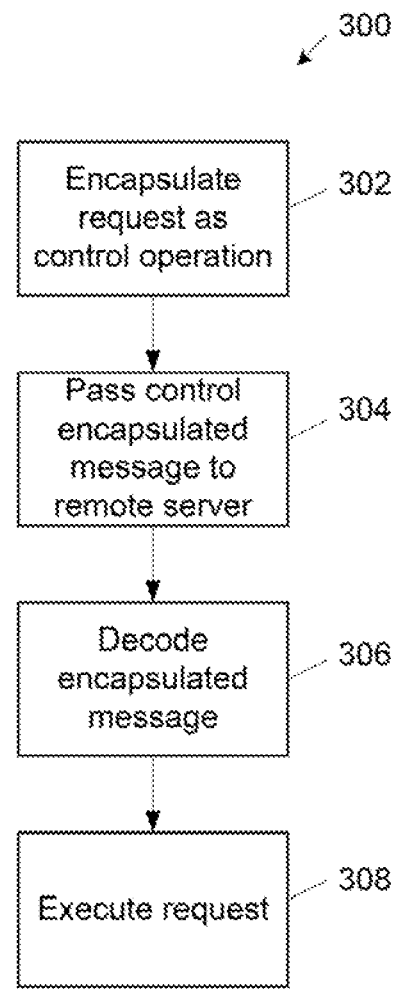
FIG. 6 is a flow chart showing one embodiment of a process flow for requesting server functionality from a remote client.

According to various embodiments, a filter component 260 is executed at the server 102. The filter component 260, for example, may be logically positioned to receive requests from the network file server 251. FIG. 6 is a flow chart showing one embodiment of a process flow 300 for requesting server functionality from a remote client 104. In various embodiments, the process flow 300 may utilize the server filter component 260. At 302, the data transformation module 218, or other suitable component at the client 104, may encapsulate a request for server functionality in an encapsulated message directed to the network file system 211. The request for server functionality may refer to any suitable functionality or other operation implemented at the server 102. For example, the request for server functionality may comprise a request for a cache coherency mechanism, a request to execute a data compaction service, etc. The encapsulated message may be formatted in a manner that is not recognized by the network file system 211 as an operation forbidden to the data transformation module 218, or not recognized at all by the network file system 211. For example, it might represent an operation that is not known to the network file system, or a data type that is not implemented by the network file system 211.

When the network file system 211 or other suitable system component fails to recognize the operation (e.g., by its operations code), it may transmit the encapsulated message to the server 102 at 304. For example, because the network file system 211 does not recognize the encapsulated message, it may be configured to forward it to the server 102. At 306, the filter component 260 at the server 102 may decode the encapsulated message to derive the request for server functionality. At 308, the filter component 260 may execute the requested server functionality. For example, the filter component 260 may forward the request for server functionality to a file system 259, network file server 251, service 255 or other component for implementing the functionality. In some embodiments, the filter component 260 may be programmed to generate and transmit a second request for server functionality in a syntax understandable to the relevant server component (e.g., network file server 251, service 255, file system 259, etc.).

Figure 7:
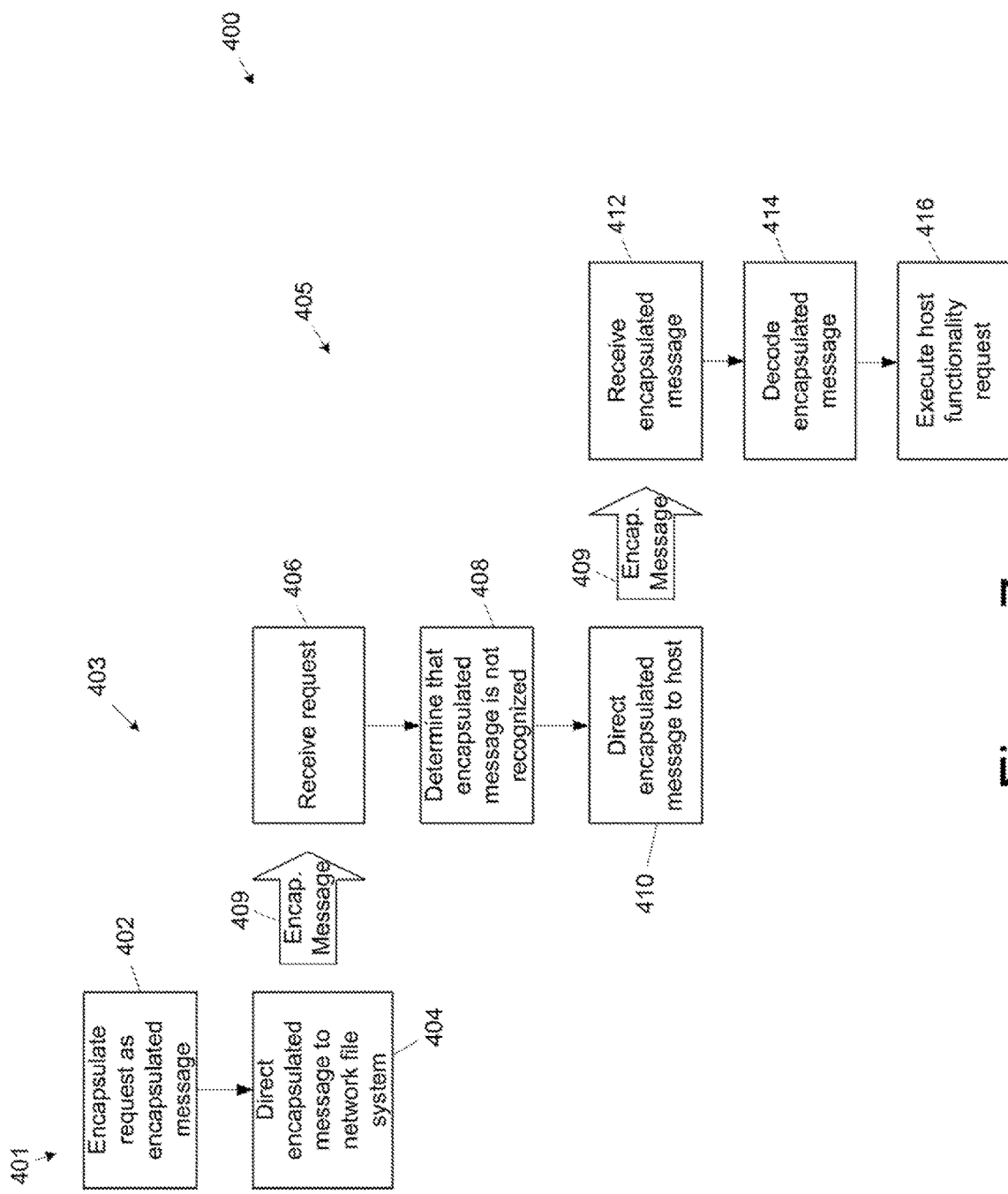
FIG. 7 is a flow chart showing another embodiment of a process flow for requesting server functionality from a remote client.

FIG. 7 is a flow chart showing another embodiment of a process flow 400 for requesting server functionality from a remote client 104. The process flow 400 is illustrated with three columns 401, 403, and 405, where each column corresponds to actions that may be performed by a different component of the network environment 100. Column 401 comprises actions that may be performed by the data transformation module 218. Column 403 comprises actions that may be performed by the network file system 211. Column 405 comprises actions that may be performed by the filter component 260. It will be appreciated that some embodiments omit the data transformation module 218. Tasks described herein as being performed by the data transformation module may, instead, be performed by the operating system 202 or any other suitable component of the client 104.

At 402, the data transformation module 218 may encapsulate a request for server functionally into an encapsulated message 409, for example, in the manner described herein. The request for server functionality may be for any suitable server functionality including, for example, for a cache coherency mechanism, for the execution of a data compaction routine, etc. At 404, the data transformation module 218 may direct the encapsulated message 409 to the network file system 211. Referring now to column 403, at 406, the network file system 211 may receive the encapsulated message 409. At 408, the network file system 211 may examine the encapsulated message 409 and determine that it does not represent an instruction to the network file system 211. Accordingly, the network file system 211 may direct the encapsulated message 409 to the server 102. The server 102 may receive the encapsulated message 409, for example, at the network file server 251. The network file system 251 may determine that it does not recognize the encapsulated message 409 and forward it to the filter component 260.

Referring now to column 405, the filter component 260 may receive the encapsulated message 409 at 412. At 414, the filter component 260 may decode the encapsulated message, resulting in the server functionality request encapsulated by the data transformation module 218 at 402. At 416, the filter component 260 may execute the server functionality request. The manner in which the filter component 260 executes the request for server functionality may differ, for example, based on the nature of the request. For example, when the request for server functionality is a request for a data compaction, or other service, offered at the server, then the filter component 260 may forward the request to the appropriate service 255 and/or generate a new service request. For example, the filter component 260 may generate a new request in a syntax that will be recognized by the service 255. When the request for server functionality is a request for a cache coherency mechanism, then the filter component 260 may forward a cache coherency request 413 to the file system 259, or other suitable component of the server 102 for handling cache coherency. In some embodiments, the filter component 260 may forward the server functionality request as-is and/or generate a new request 413 in a syntax that will be recognized by the file system 259.

Figure 8:
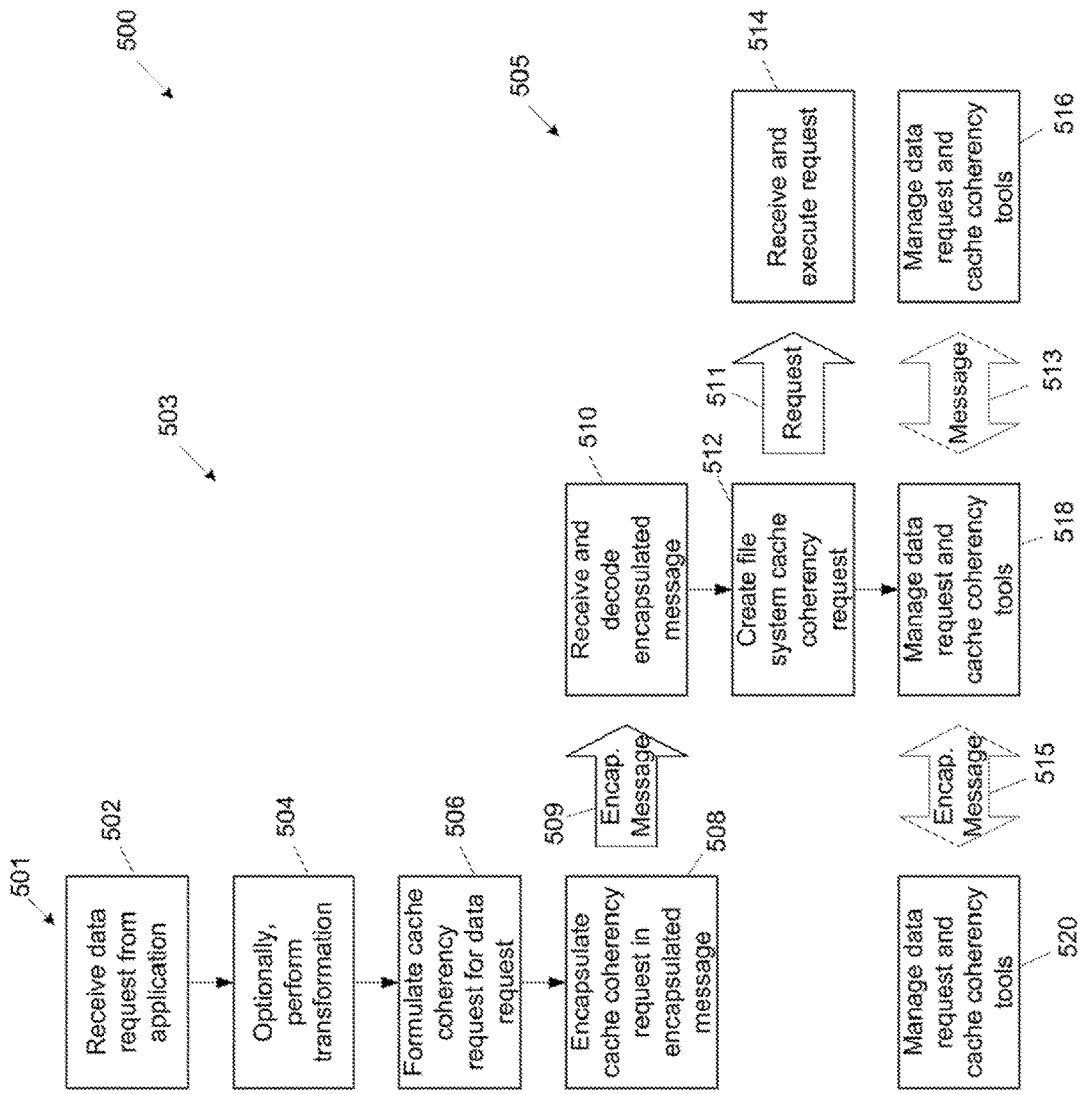
FIG. 8 is a flow chart showing another embodiment of a process flow for requesting server functionality related to a cache coherency scheme from a remote client.

FIG. 8 is a flow chart showing another embodiment of a process flow 500 for requesting server functionality related to a cache coherency scheme from a remote client 104. The process flow 500 comprises three columns, where each column corresponds to actions that may be performed by a different component of the network environment 100. Column 501 comprises actions that may be performed by the data transformation module 218. Column 503 comprises actions that may be performed by the filter component 260. Column 505 comprises actions that may be performed by the file system 259 or other suitable component of the server 102. It will be appreciated that some embodiments omit the data transformation module 218. Tasks described herein as being performed by the data transformation module may, instead, be performed by the operating system 202 or any other suitable component of the client 104.

At 502, the data transformation module 218 may receive a data request (e.g., a read or write request) from an application 204. For example, if the data request is a write request, it may comprise a data block or blocks to be written and a logical position of the data block. If the data request is a read request, it may comprise an indication of a data block or blocks to be read (e.g., a logical position of the data block). At 504, the data transformation module 218 may, optionally, perform a transformation on the data request. For example, when the data request is a write request, the data transformation module 218 may transform the data block and may optionally transform the logical position, for example, as described herein above with respect to FIGS. 3 and 4. When the data request is a read request, the data transformation module 218 may optionally transform the logical position again, for example, as described above with respect to FIGS. 3 and 4. In some embodiments, after the optional transformation at 504, the data transformation module 218 may determine whether the identified data block is already cached at the client 104. If so, then the data transformation module 218 may execute the data request from the cache and skip to the cache coherency management action 520, described in additional detail below. For example, in a read request, the data transformation module 218 may return the requested data block or blocks from cache. In a write request, the data transformation module 218 may write the provided data block or blocks to cache, superseding a previous version of the data block or blocks.

If the identified data block or blocks are not already cached, then the data transformation module 218 may formulate a cache coherency request at 506. The cache coherency request may comprise, at least, a request directed to the server 102 to execute the read or write indicated by the data request. In some embodiments, the cache coherency request may also comprise a request for a cache coherency mechanism covering the data block or blocks that are the subject of the data request. The type of cache coherency mechanism requested may depend on the nature of the data request. At 508, the data transformation module 218 may encapsulate the cache coherency request to form an encapsulated message 509, for example, as described herein. The encapsulated message 509 may be transmitted to the server 102 where it may be routed (e.g., by the network file server 251) to the filter component 260. At 510, the filter component 260 may receive and decode the encapsulated message 209. At 512, the filter component 260 may create a cache coherency request 511 corresponding to the request that was encoded in the encapsulated message. In some embodiments, the cache coherency request 511 is simply the decoded request derived from the encapsulated message 509. In other embodiments, the filter component 260 creates the cache coherency request 511 and/or modifies the decoded request to a syntax understandable to the relevant server component (e.g., network file server 251, service 255, file system 259).

The request 511 may be forwarded to the file system 259, or other server component, that may execute the request 511 at 514. The file system 259 may execute the request in any suitable manner. For example, the file system 259 may determine whether the data block or blocks that are the subject of the original data request (502) are available for the requested operation (e.g., whether the data block is covered by a cache coherency mechanism already granted to another application 204 and/or server 102). If so, then the file system 259 may execute the data request. For example, in a read request, the file system 259 may return the identified data block or blocks, which are then routed back to the requesting application 204 via the network file server 251 and network file system 211. If the cache coherency request comprises a request for a cache coherency mechanism for the data block, the file system 259 may also determine whether it is possible and permissible to grant the cache coherency mechanism, for example, as described herein below with respect to FIG. 9. At 520, 518 and 516, the data transformation module 218, filter component 260 and file system 259 (or other suitable server component) may manage data requests and cache coherency mechanisms. For example, the various components 516, 518, 520 may exchange messages 513, 515. Messages 513 between the file system 259 and the filter component 260 may be formatted according to any suitable protocol. Messages 515 between the filter component 260 and the data transformation module 218 or other suitable client component may be encapsulated, as described herein. Additional example details for managing cache coherency mechanisms are provided below with respect to FIGS. 9 and 10.

FIG. 9 is flow chart showing one embodiment of a process flow 700 that may be executed by the file system 259 or other suitable server component to handle a request for a cache coherency mechanism. At 702, the filter component 260 may receive a request for a cache coherency mechanism (e.g., as described at 514 above). At 704, the file system 259 may determine whether there is a conflict between the cache coherency mechanism request and another issued cache coherency mechanism. For example, the file system 259 may determine whether another application 204 or server 104 has been issued a cache coherency mechanism that would conflict with the requested tool. If not, the file system 259 may grant the requested cache coherency mechanism at 706. If a conflict exists at 704, the file system 259 may transmit a break request to the holder of the conflicting tool. If a response is received at 710, the file system 259 may break the conflicting cache coherency mechanism and issue the requested cache coherency mechanism. If no response is received, the file system 259 may not grant the requested cache coherency mechanism.

In various embodiments, the file system 259 or other server components may service cache coherency requests handled through the filter component 260 as though they originated from the filter component 260. For example, in some embodiments, the file system 259 and/or other sever components may not be capable of distinguishing between requests that originate from the server side and requests that originate from the client side. Accordingly, the filter component 260 may manage cache coherency mechanisms on behalf of the various clients 104 and applications 204 that make requests through the filter component 260. FIG. 10 is a flow chart showing one embodiment of a process flow 600 that may be executed by the filter component 260 to manage cache coherency requests routed through the filter component 260. At 602, the filter component 260 may maintain a record of active cache coherency mechanisms granted to the filter component 260 on behalf of various clients 104 and/or applications 204. At 604, the filter component 260 may determine whether it has received a break or other update to a cache coherency mechanism, for example, from the file system 259 via a message 513. For example, the file system 259 may have sent the break request as described above with respect to 708. If a break request, or other update is received, the filter component 260 may transmit the break request to the relevant client 104 and/or application 204 executing thereon. For example, the filter component 260 may transmit the break request as an encapsulated message described herein. If the filter component 260 receives a response at 608, then it may forward the response to the local file system 259 at 610 and update its record of active cache coherency mechanisms at 612 to indicate the broken cache coherency mechanism. It will be appreciated that the response received at 608 may also be transmitted from the client 104 as an encapsulated message.

Figure 11:
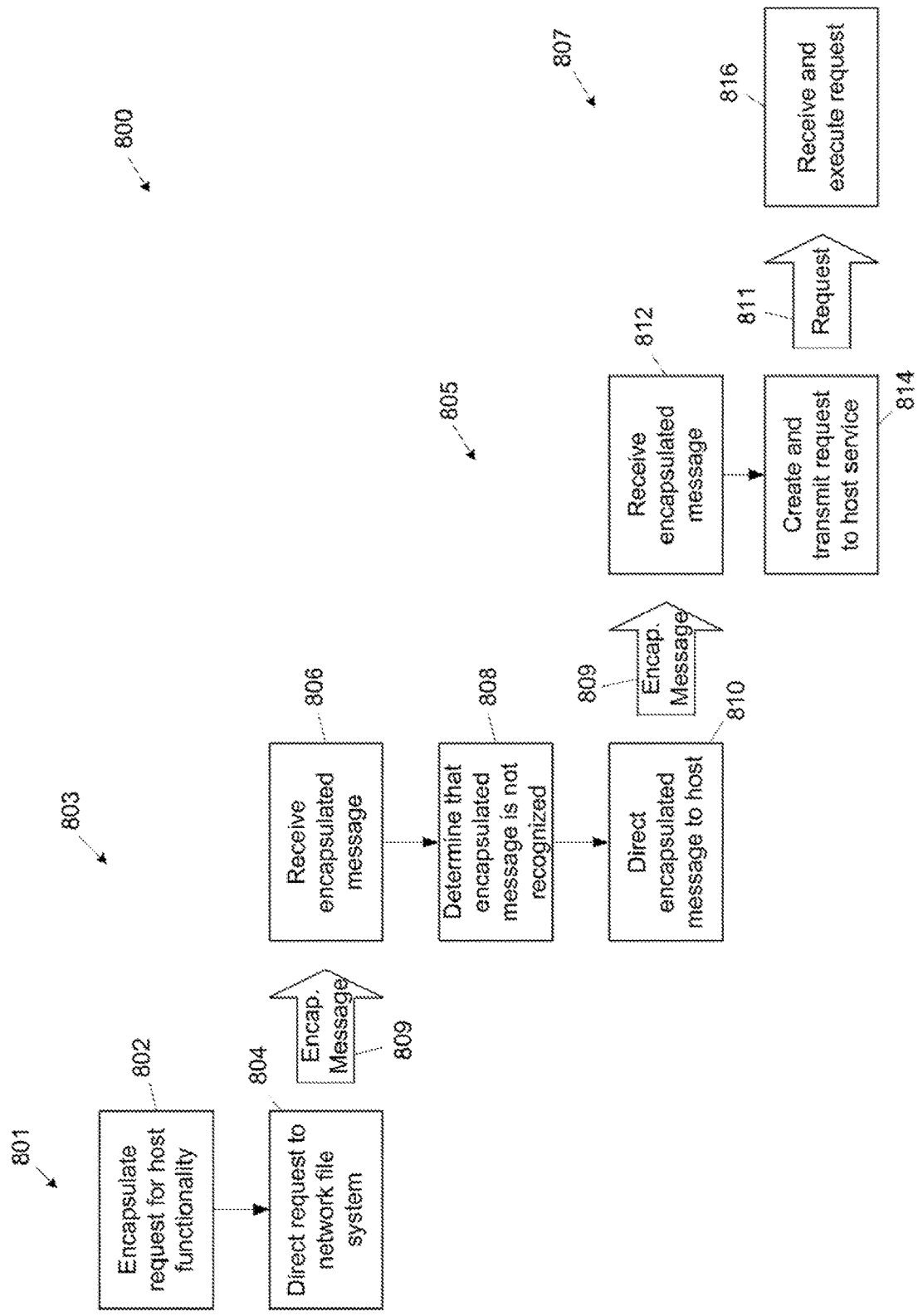
FIG. 11 is a flow chart showing one embodiment of a process flow for requesting server functionality in the form of a server-executed service.

FIG. 11 is a flow chart showing one embodiment of a process flow 800 for requesting server functionality in the form of a server-executed service. The process flow 800 comprises four columns, where each column corresponds to actions that may be performed by a different component of the network environment 100. Column 801 comprises actions that may be performed by the data transformation module 218, or other suitable client component. Column 803 comprises actions that may be performed by the network file system 211. Column 805 comprises actions that may be performed by the filter component 260. Column 807 comprises actions that may be performed by the service 255 or other suitable component of the server 102. It will be appreciated that some embodiments omit the data transformation module 218. Tasks described herein as being performed by the data transformation module may, instead, be performed by the operating system 202 or any other suitable component of the client 104.

At 802, the data transformation module 218, or other suitable client component, may encapsulate a request for a server-executed service, such as service 255. The result may be an encapsulated message 809 that is provided to the network file system 211 at 804. The service requested may be any suitable service 255 executed at the server. For example, in some embodiments, the requested service may be a data cleaning service, such as a data compaction, garbage collection or other similar service, a file name service, a file ID service and/or a file metadata service. At 806, the network file system 211 may receive the encapsulated message 809 at 806. At 808, the network file system 211 may determine that the encapsulated message 809 is not recognized as a valid request. Therefore, it may direct the encapsulated message 809 to the server 102, at 810. The server 102 (e.g., the network file system 251) may receive the encapsulated message and pass it to the filter component 260, as described herein. The filter component 260 may receive the encapsulated message at 812. In response to the encapsulated message 209, the filter component 260 may create and transmit a request 811 to the service 255. In some embodiments, the filter component 260 may simply decode the encapsulated message to generate the request 811 that may be forwarded to the service 255. Also, in some embodiments, the filter module 260 may generate a new service request 811, for example, if the decoded version of the encapsulated message is not in a syntax understandable to the service 255. The service 255 may execute the request 811 at 816.

The service 255 executed at the client 104 may perform any suitable task. In some embodiments, the service 255 may be a data compaction or trash collection service. Data compaction or trash collection services may be particularly useful in implementations where the data transformation module 218 or other suitable client 104 component implements a log-structured file system, or other file system where new data blocks are written to the end of data containers. For example, referring again to FIG. 4, all new data blocks 402 are written to the logical end of the data container 400 along with descriptive log blocks 404. Accordingly, data blocks 402 that are logically superseded by new data blocks 402 may not be removed from the data container 400 in the ordinary course of use. A data cleaning or compaction service may traverse data containers 400, which may be stored as files according to the file system 259, and remove data blocks 402 that have been logically superseded. It is possible for such a service to be executed from the client 104. It will be appreciated, however, implementing this functionality at the server 102 can increase efficiency by eliminating a large number of read/write requests that would otherwise be transmitted between the server 102 and the client 104.

Another example server-side service is a file identification or file ID service. According to many file systems, each file or other data container is associated with a file ID. The file ID uniquely identifies the file. A file ID may be globally unique, or unique within a predetermined logical unit, such as a particular logical drive or other volume. When an operating system 202, application 204 or other system component needs to verify the identity of a file and/or determine whether two files are identical, it may request a file ID, for example, from the relevant file system 209, 212. With many network file systems 211, however, this feature is not available for files stored remotely. For example, upon retrieval of a file from the shared file storage 258, the network file system 211 may respond to file ID requests regarding the file by providing a randomly generated ID and not the file ID that the file possessed at the shared data storage.

Various embodiments address this issue utilizing a server-executed service, for example, as described herein. For example, the data transformation module 218 or other suitable component at the client 104 may direct a file ID request to a service 255 at the server 102. The request may be directed as described herein above, for example, with respect to FIGS. 6, 7, and 11. The service 255 may, in response query the file system 259 or other suitable server component to determine a file ID of the relevant file. Because the query is directed to the local file system 259 of the server 102 rather than the network file system 211, it may return the correct file ID. This file ID may be returned to the requesting component at the client 104, for example, as described herein. In this way applications 204, operating systems 202 and other components at the host may enjoy file ID functionality for files stored at the shared data storage 258.

Yet another example server-side service is a file naming service. Some existing network file systems include quirky features relating to file naming functionality. For example, when a component at a client 104 changes the name of a file or other data container, the name change is reflected at the server 102, but is not subsequently accessible at the client 104. For example, when an application 204 changes the name of a file from the server 102, and that application 204 or another client component later requests the name of that file, the file system 211 will return the old file name, not the newly changed name. To address this problem, the server 102 may execute a service 255 for determining file names. For example, when a component of the client 104 needs the name of a file, it may direct a request to a server-side service 255. The request may be encapsulated and passed as described herein above, for example, with respect to FIGS. 6, 7 and 11. The service 255 may receive the request and query the file system 259 to determine the file name. The determined name may be returned to the requesting client component.

Figure 12:
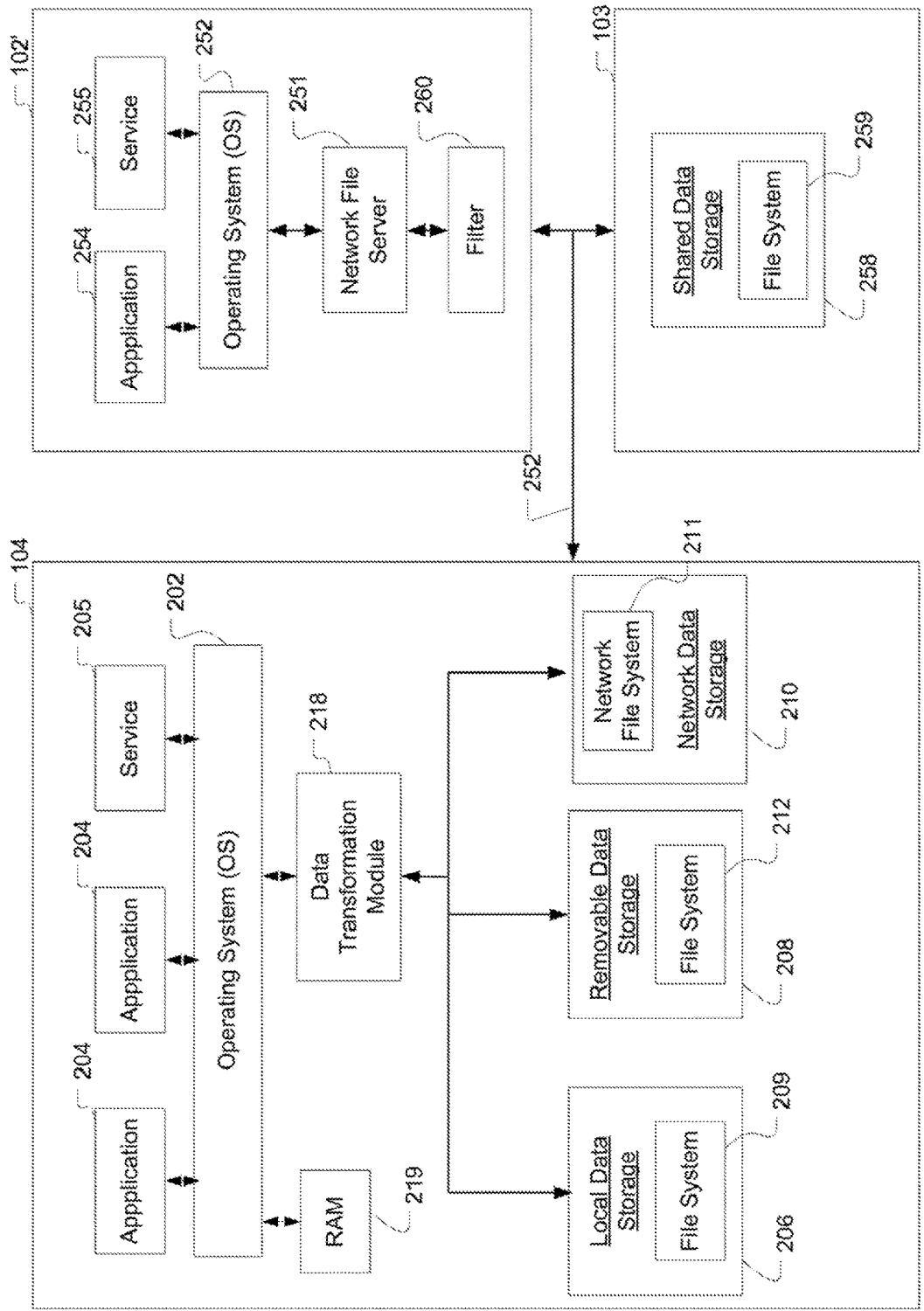
FIG. 12 is a logical block diagram showing system architectures for another embodiment of the client, a server and a remote data storage according to another example network arrangement.

Another example application of server-side service relates to Fibre Channel, Internet Small Computer System Interface (iSCSI) and other network arrangements where data storage is at a logical network location distinct from that of the server. FIG. 12 is a logical block diagram showing system architectures for another embodiment of the client 104, a server 102' and a remote data storage 103 according to such a network arrangement. As illustrated in FIG. 12, the remote data storage 103 is separate from the server 102'. Data requests are transmitted from the client 104 to the server 102' across the network connection 252. The server 102', then, accesses the data storage 103 by sending additional requests over the network connection 252. Accordingly, each data request results in two network transactions, one between the client 104 and the server 102' and a second between the server 102' and the data storage 103.

According to various embodiments, a server-executed service 255 may be utilized to allow the client 104 to directly access the data storage 103, thus reducing the number of required transactions. For example, the server-executed service 255 may gather location information regarding the data to be manipulated. This may include, for example, sector and/or cluster information describing the physical and/or logical position of the data on the shared data storage 258. The server-executed service 255 may provide this information to the client 104. The client 104, in turn, may be configured to access the data storage 103 directly, removing the network communications associated with directing data requests from the server 102' to the data storage 103.

Figure 13:
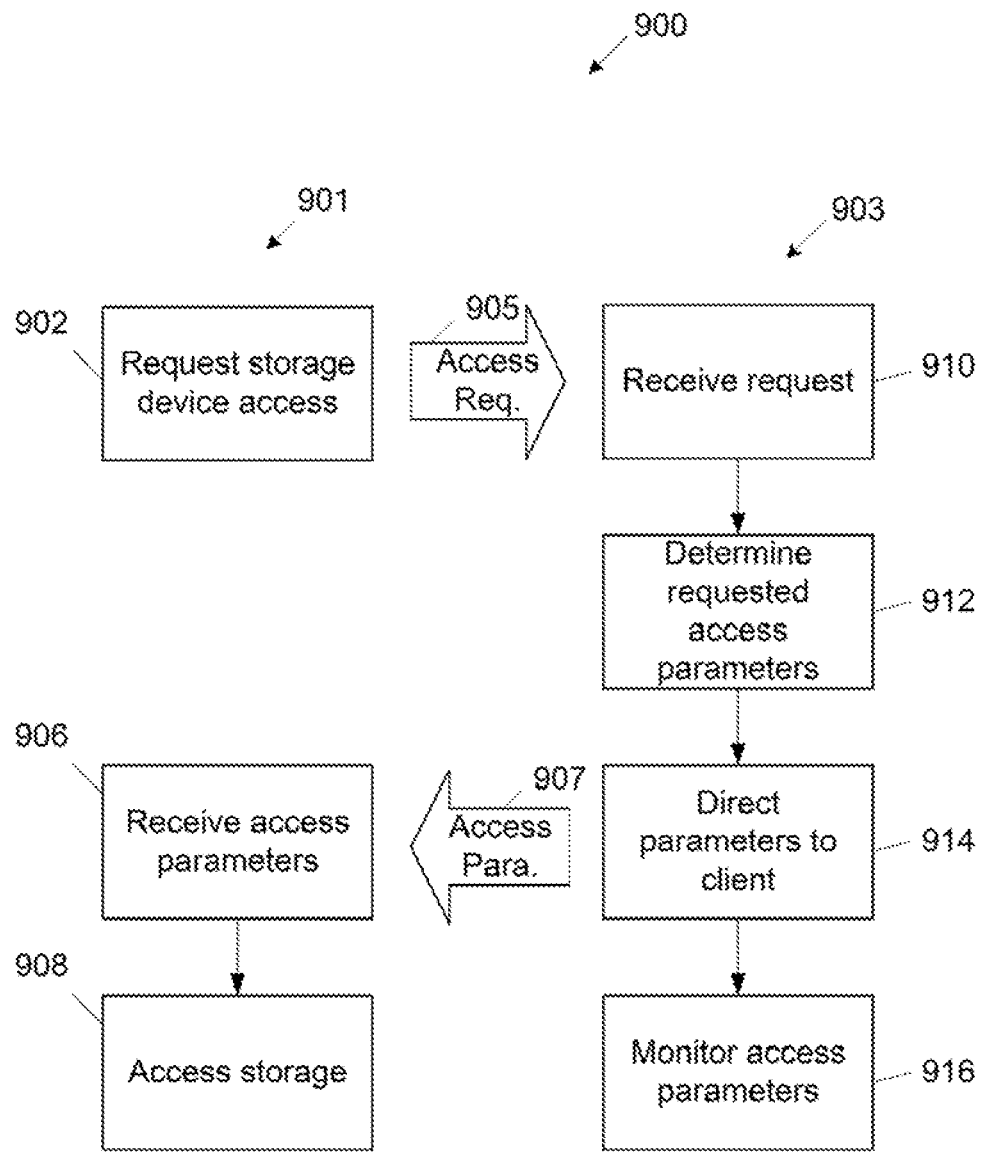
FIG. 13 is flow chart showing one embodiment of a process flow for implementing a server-executed service to retrieve data location information.

FIG. 13 is flow chart showing one embodiment of a process flow 900 for implementing a server-executed service to retrieve data location information. A column 901 indicates actions that may be performed by the client 104 and/or a component thereof. Column 903 indicates actions that may be performed by the server 102' and/or a component thereof. At 902, the client 104 may request storage device access. For example, an access request 905 may be transmitted from the client 104 to the server 102'. The server 102' may receive the request at 910. The access request 905 may be encapsulated and passed to the server 102' as described herein above, for example, with respect to FIGS. 6, 7 and 11.

At 912, the server 102', e.g., a server 255 thereof, may determine the requested access parameters. The access parameters may provide data location information that the client 104 requires to access the relevant data at the data storage 103. This information may include, for example, a logical and/or physical position of the data at the shared data storage 258. In some embodiments, the access parameters may also indicate limitations under which the client 104 is authorized to access the data. For example, the server 102 may define the extent of allowed operations (e.g., read, write, attribute, handle). Also, in some embodiments, the server 102 may indicate the duration of permitted access (e.g., a set period of time, until a cancellation message is received from the server, etc.).

At 914, the server 102' may direct the access parameters 907 to the client 104. The client 104 may receive the access parameters at 906 and may access data storage 103 at 908 utilizing (and under the terms of) the access parameters 907. In some embodiments, the server 102' may additionally monitor the access parameters 916. For example, while a client 104 has valid access parameters for a given data unit, the server 102' may refrain from providing incompatible access parameters to other clients 104. Also, for example, the server 102' (e.g., the relevant service 255 thereof) may receive access requests from other clients and, upon receipt, may revoke or terminate the access parameters of the client 104.

In some example embodiments, the server 102 may utilize encapsulated messages to request client functionality. For example, a service 255, application 254 or other component of the server 102 may direct a request to a service 205 of the client 104. The request may be directed to the filter component 260. The filter component may encapsulate the request to generate an encapsulated message. The encapsulated message may be forwarded to the network file server 251. In some embodiments, the network file server 251 may fail to recognize the encapsulated message. This may prevent the network file server 251 from blocking the request. Accordingly, the network file server 251 may pass the encapsulated message on to the client 104, for example, to the network file system 211. The network file system 211 may pass the encapsulated message to the data transformation module 218. The data transformation module 218 may, in turn, decode the encapsulated message and direct the request to the service 205. For example, the data transformation module 218 may forward the decoded request from the encapsulated message to the service 205 and/or generate a new request according to a desired syntax.

Referring again to FIG. 5, in some embodiments, the filter module 260 may also perform data transformations, for example, similar to the data transformations performed by the data transformation module 218 described herein above. For example, the filter module 260 may be logically positioned between applications 254 and services 255 of the server 102 and the shared data storage 258. The applications 254, services 255 and/or other components of the server 102 may make data requests similar to those described herein. The data requests may be routed, by the operating system 252 and/or the network file server 251 to the filter component 260. The filter component 260 may perform desired transformations and forward modified data requests to the file system 259. Also, in some embodiments, the filter module 260 may replace the functionality of the data transformation module 218. For example, data requests and cache coherency requests may be forwarded from the client 104 through the network file system 211 and to the filter module 260, where the filter module may perform various transformations, for example, as described herein.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Reference in the specification to "one embodiment," to "an embodiment" or to "various embodiments" means that a particular feature, structure, or characteristic described in connection with the embodiments is included in at least one embodiment of the invention. The appearances of the phrase "in one embodiment" or "in various embodiments" in various places in the specification are not necessarily all referring to the same embodiment. Reference to embodiments is intended to disclose examples, rather than limit the claimed invention. While the invention has been particularly shown and described with reference to several example embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

It is to be understood that the figures and descriptions of embodiments of the present invention have been simplified to illustrate elements that are relevant for a clear understanding of the present invention, while eliminating, for purposes of clarity, other elements, such as, for example, details of system architecture. Those of ordinary skill in the art will recognize that these and other elements may be desirable for practice of various aspects of the present embodiments. However, because such elements are well known in the art, and because they do not facilitate a better understanding of the present invention, a discussion of such elements is not provided herein.

It should be appreciated that figures presented herein are intended for illustrative purposes and are not intended as design drawings. Omitted details and modifications or alternative embodiments are within the purview of persons of ordinary skill in the art. Furthermore, whereas particular embodiments of the invention have been described herein for the purpose of illustrating the invention and not for the purpose of limiting the same, it will be appreciated by those of ordinary skill in the art that numerous variations of the details, materials and arrangement of parts/elements/steps/functions may be made within the principle and scope of the invention without departing from the invention as described in the appended claims.

It can be appreciated that, in some embodiments of the present methods and systems disclosed herein, a single component can be replaced by multiple components, and multiple components replaced by a single component, to perform a given function or functions. Except where such substitution would not be operative to practice the present methods and systems, such substitution is within the scope of the present invention. Examples presented herein, including operational examples, are intended to illustrate potential implementations of the present method and system embodiments. It can be appreciated that such examples are intended primarily for purposes of illustration. No particular aspect or aspects of the example method, product, computer-readable media, and/or system embodiments described herein are intended to limit the scope of the present invention.

It will be appreciated that the servers 102, 102', clients 104, data storage locations 103 and other similar devices described herein may be any suitable type of computing device including, for example, desktop computers, laptop computers, mobile phones, palm top computers, personal digital assistants (PDA's), etc. As used herein, a "computer," "computer system," "computer device," or "computing device," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and displays presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

What is claimed is:

1. A client computer device configured to communicate with a remote server over a network connection, the client computer device comprising:
   a network file system in communication with the remote server, wherein the network file system is configured to block a request, generated by the client computer device, for a certain type of server functionality from being sent by the client computer device to the remote server; and
   a data transformation module configured to:
      receive the request for the certain type of server functionality,
      encapsulate the request in an encapsulated message that is not recognized by the network file system as an operation forbidden to the data transformation module, and
      send the encapsulated message to the network file system for communication to the remote server to decode the encapsulated message to implement the certain type of server functionality.

2. The client computer device of claim 1, wherein the encapsulated message is formatted in a manner that is not recognized by the network file system as an operation forbidden to the data transformation module, or not recognized by the network file system.

3. The client computer device of claim 1, wherein the request for the certain type of server functionality is a request for:
   a cache coherency mechanism, a data compaction service, a data cleaning service, a garbage collection service, a file name service, a file ID service or a file metadata service.

4. The client computer device of claim 1, wherein the request for the certain type of server functionality is a request for a cache coherency mechanism.

5. The client computer device of claim 1, comprising:
   at least one processor; and
   a data store operatively associated with the at least one processor,
   wherein the at least one processor is programmed to execute the network file system.

6. The client computer device of claim 1, wherein the encapsulated message is decoded by a filter component at the remote server so that the remote server produces a response to the requested server functionality, and
   wherein the network file system receives the response to the requested server functionality in a second encapsulated message and decodes the second encapsulated message to access the response from the remote server.

7. A method, comprising:
   receiving, at a data transformation module of a client computer device, a request for a certain type of remote server functionality from the client computer device, the client computer device comprising a network file system that is configured to block the request for a certain type of remote server functionality from being sent to a remote server;
   encapsulating the request in an encapsulated message at the data transformation module that is not recognized by the network file system as an operation forbidden to the data transformation module;
   directing the encapsulated message from the data transformation module to the network file system of the client computer device; and transmitting the encapsulated message from the network file system to the remote server to decode the encapsulated message to implement the certain type of server functionality.

8. The method of claim 7, wherein the encapsulating the request in the encapsulated message comprises:
formatting the encapsulated message in a manner that is not recognized by the network file system as an operation forbidden to the data transformation module, or not recognized by the network file system.

9. The method of claim 7, wherein the request for the certain type of server functionality is a request for:
a cache coherency mechanism, a data compaction service, a data cleaning service, a garbage collection service, a file name service, a file ID service or a file metadata service.

10. The method of claim 7, wherein the request fix the certain type of server functionality is a request for a cache coherency mechanism.

11. The method of claim 7, wherein the network file system is implemented by at least one processor, and wherein the at least one processor is coupled to a data store operatively associated with the at least one processor.

12. The method of claim 7, wherein the encapsulated message is decoded by a filter component at the remote server so that the remote server produces a response to the requested server functionality, and
wherein the network file system receives the response to the requested server functionality in a second encapsulated message and decodes the second encapsulated message to access the response from the remote server.

13. A server computer device configured to communicate with a client computer device over a network connection, the server computer device comprising:
a network file server in communication with the client computer device; and
a filter coupled to the network file server, wherein the network file server is configured to:
receive an encapsulated message that includes a request for a certain type of server functionality from the client computer device;
determine that the encapsulated message is not recognized by the network file system as an operation forbidden to the data transformation module; and
direct the encapsulated message to the filter in response to the determination that the encapsulated message does not represent an instruction to the network file system, and
wherein the filter is configured to:
receive the encapsulated message from the network file server;
decode the encapsulated message to reveal the request for the certain type of server functionality; and
execute one or more processes according to the request for the certain type of server functionality.

14. The server computer device of claim 13, wherein the request for the certain type of server functionality is a type, of which a network file system in the client computer device is configured to block from reaching the server computer device.

15. The server computer device of claim 13, wherein the request for the certain type of server functionality is a request for:
a cache coherency mechanism, a data compaction service, a data cleaning service, a garbage collection service, a file name service, a file ID service or a file metadata service.

16. The server computer device of claim 13, wherein the request for the certain type of server functionality is a request for a cache coherency mechanism that permits local caching of a first data block at the client computer device, wherein the cache coherency mechanism is breakable by the network file server.

17. The server computer device of claim 13, comprising:
at least one processor; and
a data store operatively associated with the at least one processor,
wherein the at least one processor is configured to execute the network file system.

18. The server computer device of claim 17, wherein the at least one processor is further configured to:
generate a second encapsulated message, wherein the second encapsulated message comprises a response to the request for the certain type of server functionality; and
transmit the second encapsulated message to the client computer device.

19. A method of providing a server functionality from a server computer device to a client computer device that is coupled to the server computer device, the method comprising:
receiving an encapsulated message from the client computer device at a network file server of the server computer device, wherein the first encapsulated message includes a request for a certain type of server functionality;
determining that the encapsulated message is not recognized by the network file system as an operation forbidden to the data transformation module;
directing the encapsulated message to a filter component of the server computer device in response to the determining that the encapsulated message does not represent an instruction to the network file system;
receiving the encapsulated message at the filter component of the server computer device; and
decoding the encapsulated message at the filter component of the server computer device to reveal the request for the certain type of server functionality; and executing according to the request for server functionality.

20. The method of claim 19, wherein the request for the certain type of server functionality is a request for:
a cache coherency mechanism, a data compaction service, a data cleaning service, a garbage collection service, a file name service, a file ID service or a file metadata service.

21. The method of claim 19, wherein the request for the certain type of server functionality is a request for a cache coherency mechanism that permits local caching of a first data block at the client computer device, wherein the cache coherency mechanism is breakable by the network file server.

22. The method of claim 19, wherein the server computer device comprises:
at least one processor; and
a data store operatively associated with the at least one processor,
the method further comprising executing the network file system with the at least one processor.

23. The method of claim 22, further comprising:
generating a second encapsulated message with the at least one processor, wherein the second encapsulated message comprises a response to the request for the certain type of server functionality; and transmitting the second encapsulated message to the client computer device.

24. A computer-based system, comprising:
a server computer device; and
a client computer device configured to communicate with the server computer device over a network connection,
the client computer device comprising:
  a network file system in communication with the remote server, wherein the network file system is configured to block a request, generated by the client computer device, for a certain type of server functionality from being sent by the client computer device to the server computer device,
  a data transformation module configured to:
    receive the request for the certain type of server functionality,
    encapsulate the request in an encapsulated message that is not recognized by the network file system as an operation forbidden to the data transformation module, and
    direct the encapsulated message to the network file system,
  wherein the network file system transmits the encapsulated message to the remote server; and
the server computer device comprising:
  a network file server; and
  a filter coupled to the network file server of the server computer device,
  wherein the network file server of the server computer device is configured to:
    receive the encapsulated message that includes the request for the certain type of server functionality from the client computer device that is coupled to the server computer device,
    determine that the encapsulated message does not represent an instruction to the network file system of the server computer device, and
    direct the encapsulated message to the filter in response to determining that the encapsulated message does not represent an instruction to the network file system of the server computer device,
  wherein the filter is configured to:
    receive the encapsulated message from the network file server of the server computer device;
    decode the encapsulated message to reveal the request for the certain type of server functionality; and
    execute one or more processes according to the request for the certain type of server functionality.

25. The system of claim 24, wherein the encapsulated message is formatted in a manner that is not recognized by the network file system of the client computer device as an operation forbidden to the data transformation module, or not recognized by the network file system of the client computer device.

26. The system of claim 24, wherein the request for the certain type of server functionality is a request for:
a cache coherency mechanism, a data compaction service, a data cleaning service, a garbage collection service, a file name service, a file ID service or a file metadata service.

27. The system of claim 24, wherein the request for the certain type of server functionality is a request for a cache coherency mechanism.

* * * * *